US011891982B2

(12) United States Patent
Wegmann et al.

(10) Patent No.: US 11,891,982 B2
(45) Date of Patent: Feb. 6, 2024

(54) METHOD FOR CONTROLLING A WIND TURBINE

(71) Applicant: Wobben Properties GmbH, Aurich (DE)

(72) Inventors: Harald Wegmann, Neuschoo (DE); Timm Mross, Rhauderfehn (DE); Reinhard Cloppenburg, Westerholt (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/296,363

(22) PCT Filed: Nov. 26, 2019

(86) PCT No.: PCT/EP2019/082539
§ 371 (c)(1),
(2) Date: May 24, 2021

(87) PCT Pub. No.: WO2020/109288
PCT Pub. Date: Jun. 4, 2020

(65) Prior Publication Data
US 2022/0025852 A1   Jan. 27, 2022

(30) Foreign Application Priority Data
Nov. 27, 2018 (DE) .............. 10 2018 129 867.6

(51) Int. Cl.
*F03D 7/02* (2006.01)
*F03D 7/04* (2006.01)
(Continued)

(52) U.S. Cl.
CPC .......... *F03D 7/026* (2013.01); *F03D 7/0224* (2013.01); *F03D 7/0264* (2013.01); *F03D 7/042* (2013.01);
(Continued)

(58) Field of Classification Search
CPC ...... F03D 7/0224; F03D 7/026; F03D 7/0264; F03D 7/042; F03D 9/255; F03D 80/50;
(Continued)

(56) References Cited

U.S. PATENT DOCUMENTS 5,028,804 A * 7/1991 Lauw .................. H02P 9/42
290/40 C
5,140,856 A * 8/1992 Larsen ................ F03D 80/50
73/458

(Continued)

FOREIGN PATENT DOCUMENTS

CN   101094985 A   12/2007
CN   101334000 A   12/2008
(Continued)

*Primary Examiner* — Tulsidas C Patel
*Assistant Examiner* — Thomas K Quigley
(74) *Attorney, Agent, or Firm* — Seed IP Law Group LLP

(57) ABSTRACT

There is provided a method of controlling a wind turbine on starting or running up the wind turbine before the wind turbine is connected to an electrical supply grid or before the wind turbine is connected to the electrical energy supply grid again. The wind turbine has a rotor having a rotor arresting means, at least one rotor blade and at least one blade angle detection sensor for each rotor blade for detecting the blade angle of the rotor blade. The blade angle of the at least one rotor blade is detected by means of the blade angle detection sensor. Unlocking of the rotor arresting means is blocked until the detected at least one blade angle is within a predetermined angle range. In that way it is possible to ensure that the rotor arresting means is released only when the blades are for example in the feathered position.

3 Claims, 5 Drawing Sheets

(51) Int. Cl.
*F03D 9/25* (2016.01)
*F03D 80/50* (2016.01)

(52) U.S. Cl.
CPC .............. *F03D 9/255* (2017.02); *F03D 80/50* (2016.05); *F05B 2260/31* (2020.08); *F05B 2270/1075* (2013.01); *F05B 2270/328* (2013.01)

(58) Field of Classification Search
CPC .......... F05B 2260/31; F05B 2270/1075; F05B 2270/328
See application file for complete search history.

(56) References Cited

U.S. PATENT DOCUMENTS

| | | | | |
|---|---|---|---|---|
| 7,011,497 B2* | 3/2006 | Schmidt | ................ | F03D 1/0658 415/216.1 |
| 7,207,777 B2* | 4/2007 | Bervang | ................ | B66C 1/108 416/142 |
| 7,394,166 B2* | 7/2008 | Teichmann | ........... | F03D 7/0284 290/55 |
| 8,334,608 B2* | 12/2012 | Pechlivanoglou | ...... | F03D 13/20 290/55 |
| 8,963,361 B2* | 2/2015 | Falkenberg | ............. | F03D 13/10 290/55 |
| 9,217,418 B2* | 12/2015 | Bodewes | ................ | H02M 7/49 |
| 9,447,776 B2* | 9/2016 | Munk-Hansen | .......... | F03D 9/25 |
| 9,698,715 B2* | 7/2017 | Bodewes | ............. | F03D 9/11 |
| 10,774,808 B2* | 9/2020 | Achenbach | ............. | F03D 13/30 |
| 10,975,732 B2* | 4/2021 | Manikas | ................. | F03D 80/50 |
| 2005/0019166 A1* | 1/2005 | Bervang | ................ | B66C 13/08 416/244 A |
| 2006/0275121 A1* | 12/2006 | Merswolke | ........... | F03D 7/0264 416/132 B |
| 2007/0138796 A1* | 6/2007 | Hornemann | ........... | G01R 31/34 290/44 |
| 2007/0266538 A1* | 11/2007 | Bervang | ............... | F03D 1/0658 29/700 |
| 2009/0004009 A1* | 1/2009 | Egedal | .................... | F03D 80/50 416/1 |
| 2009/0278359 A1 | 11/2009 | Trede | | |
| 2010/0013224 A1* | 1/2010 | Edenfeld | .................. | F03D 9/17 290/44 |
| 2010/0142237 A1* | 6/2010 | Yuan | ........................ | H02J 3/381 290/44 |
| 2010/0194114 A1* | 8/2010 | Pechlivanoglou | .... | F03D 7/0248 290/55 |
| 2010/0232978 A1* | 9/2010 | Nielsen | ................... | F03D 80/50 416/248 |
| 2011/0280725 A1* | 11/2011 | Taylor | ..................... | F03D 7/043 416/169 R |
| 2012/0137481 A1* | 6/2012 | Lindberg | .............. | F03D 7/0268 29/23.51 |
| 2012/0146423 A1* | 6/2012 | Bodewes | ................ | H02M 7/49 307/84 |
| 2013/0243595 A1* | 9/2013 | Falkenberg | ............. | F03D 13/10 29/889.1 |
| 2014/0127014 A1 | 5/2014 | Vilbrandt et al. | | |
| 2014/0225369 A1* | 8/2014 | Bodewes | .................. | H02P 9/00 290/44 |
| 2014/0248118 A1 | 9/2014 | Wenclik et al. | | |
| 2015/0381089 A1* | 12/2015 | Tarnowski | ................ | H02J 3/40 290/44 |
| 2018/0335014 A1* | 11/2018 | Achenbach | ............. | F03D 9/255 |
| 2020/0088163 A1 | 3/2020 | Giengiel et al. | | |
| 2020/0124022 A1* | 4/2020 | Janssen | ................... | F03D 7/047 |
| 2022/0025852 A1* | 1/2022 | Wegmann | ............. | F03D 7/0264 |

FOREIGN PATENT DOCUMENTS

| | | |
|---|---|---|
| CN | 101463798 A | 6/2009 |
| CN | 107208608 A | 9/2017 |
| CN | 108779760 A | 11/2018 |
| DE | 102004005169 B3 | 11/2005 |
| DE | 102008022383 A1 | 11/2009 |
| DE | 102009017244 A1 | 10/2010 |
| DE | 102010039628 A1 | 2/2012 |
| DE | 102010037695 A1 | 3/2012 |
| DE | 102011079269 A1 | 1/2013 |
| DE | 102013004580 A1 | 9/2014 |
| EP | 2009279 A1 | 12/2008 |
| EP | 2343453 A2 | 7/2011 |
| EP | 2775138 A2 | 9/2014 |
| EP | 2905467 A1 | 8/2015 |
| EP | 2963287 A1 | 1/2016 |
| EP | 3219986 A1 | 9/2017 |
| KR | 20130024107 A | 3/2013 |
| WO | WO 2004/092580 A1 | 10/2004 |
| WO | 2014097433 A1 | 6/2014 |

* cited by examiner

METHOD FOR CONTROLLING A WIND TURBINE

BACKGROUND

Technical Field

The present invention concerns a method of controlling a wind turbine when starting or running up the wind turbine, a mobile controller and a wind turbine.

Description of the Related Art

In normal operation the wind turbine is connected to an electrical supply grid and delivers electrical energy to the supply grid. If however there is no wind it can then happen that the wind turbine itself draws electrical energy from the energy supply grid to maintain turbine operation.

On the German patent application from which priority is claimed the German Patent and Trade Mark Office searched the following documents: EP 2 905 467 A1, DE 10 2008 022 383 A1, DE 10 2010 039 628 A1, DE 2010 037 695 A1, DE 10 2013 004 580 A1 and EP 2 963 287 A1.

BRIEF SUMMARY

In addition in construction the wind turbine is typically also not yet connected to the electrical energy supply grid and therefore cannot take energy from the supply grid to control the wind turbine. A so-called construction aid for example can be provided for controlling the wind turbine while it is not connected to the electrical energy supply grid. That construction aid can have an electrical power supply and a controller.

Provided is a method of controlling a wind turbine on starting or running up the wind turbine before the wind turbine is connected to an electrical supply grid.

Provided is a method of controlling a wind turbine on starting or running up the wind turbine before the wind turbine is connected to an electrical supply grid or before the wind turbine is connected to the electrical energy supply grid again. The wind turbine has a rotor having a rotor arresting means, at least one rotor blade and at least one blade angle detection sensor for each rotor blade for detecting the blade angle of the rotor blade. The blade angle of the at least one rotor blade is detected by means of the blade angle detection sensor. Unlocking of the rotor arresting means is blocked until the detected at least one blade angle is within a predetermined angle range. In that way it is possible to ensure that the rotor arresting means is released only when the blades are for example in the feathered position.

That makes it possible in particular to avoid a highly dangerous situation when constructing a wind turbine if the rotor arresting means is released and the wind turbine is not yet connected to the electrical supply grid in order for example to be able to carry out a blade angle adjustment operation and the wind which is blowing at the time causes the aerodynamic rotor (hub+rotor blades) to rotate without being braked.

According to an aspect of the present invention, the blade angle detection sensor can have inductive sensors and position gauges. Detection of the blade angle can however also be effected by way of any other sensors.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
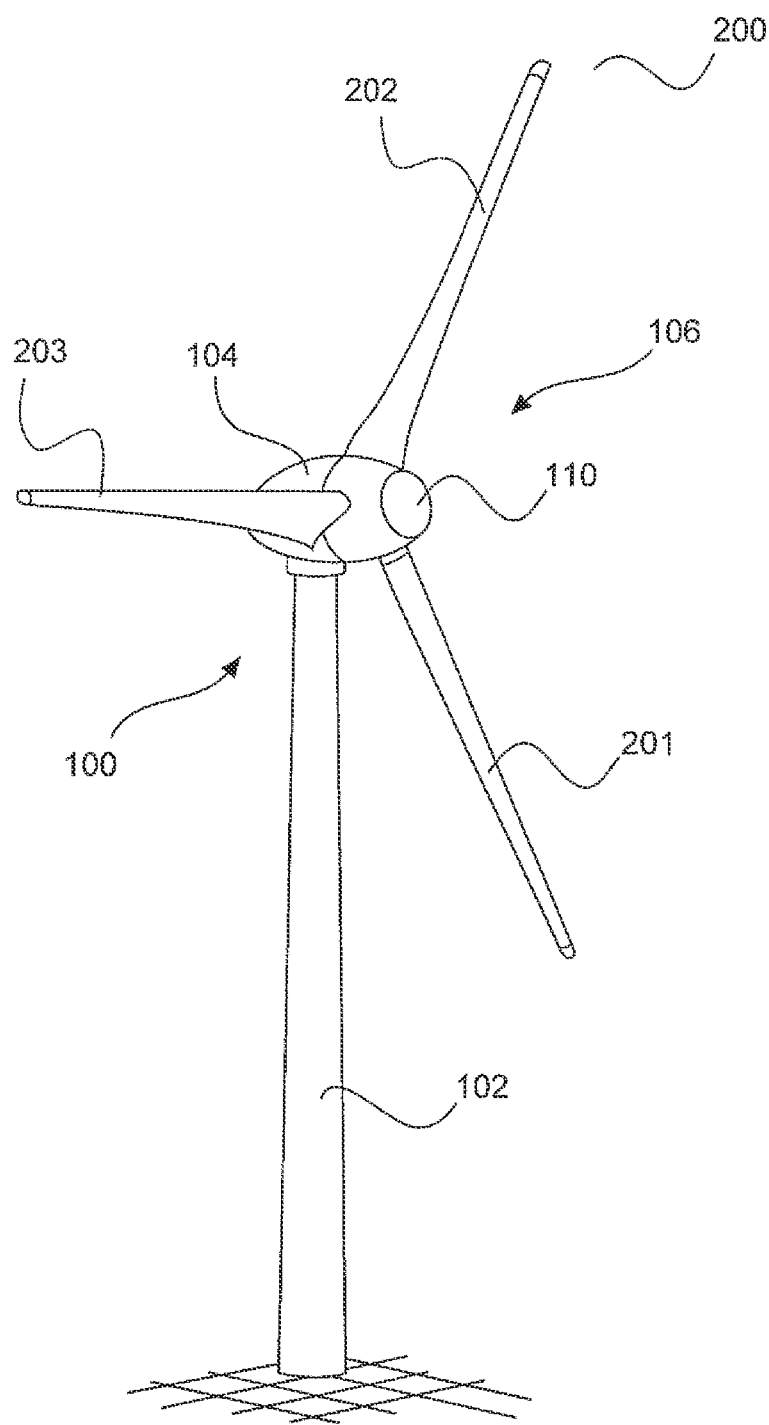
FIG. 1 shows a diagrammatic view of a wind turbine according to an aspect of the present invention, FIGS. 2 and 3 each show a diagrammatic view of the functional groups of a wind turbine according to a first embodiment of the invention, and FIGS. 4 and 5 each show a diagrammatic view of the functional groups of a wind turbine according to a second embodiment of the invention.

FIG. 1 shows a diagrammatic view of a wind turbine according to an aspect of the present invention. The wind turbine 100 has a tower 102 with a nacelle 104 and an aerodynamic rotor 106. The aerodynamic rotor 106 has at least one rotor blade 200, 201-203. The blade angle of the rotor blades 200, 201-203 can be adjusted for example by means of a pitch motor (not shown). The rotor 106 can be arrested by a rotor arresting device or means 300 such as the arresting device described in US Pat. Pub. No. 2020/0088163, which is incorporated by reference herein. Optionally there can be provided a rotor brake 400 which serves to be able to brake the aerodynamic rotor 106.

Figure 2:
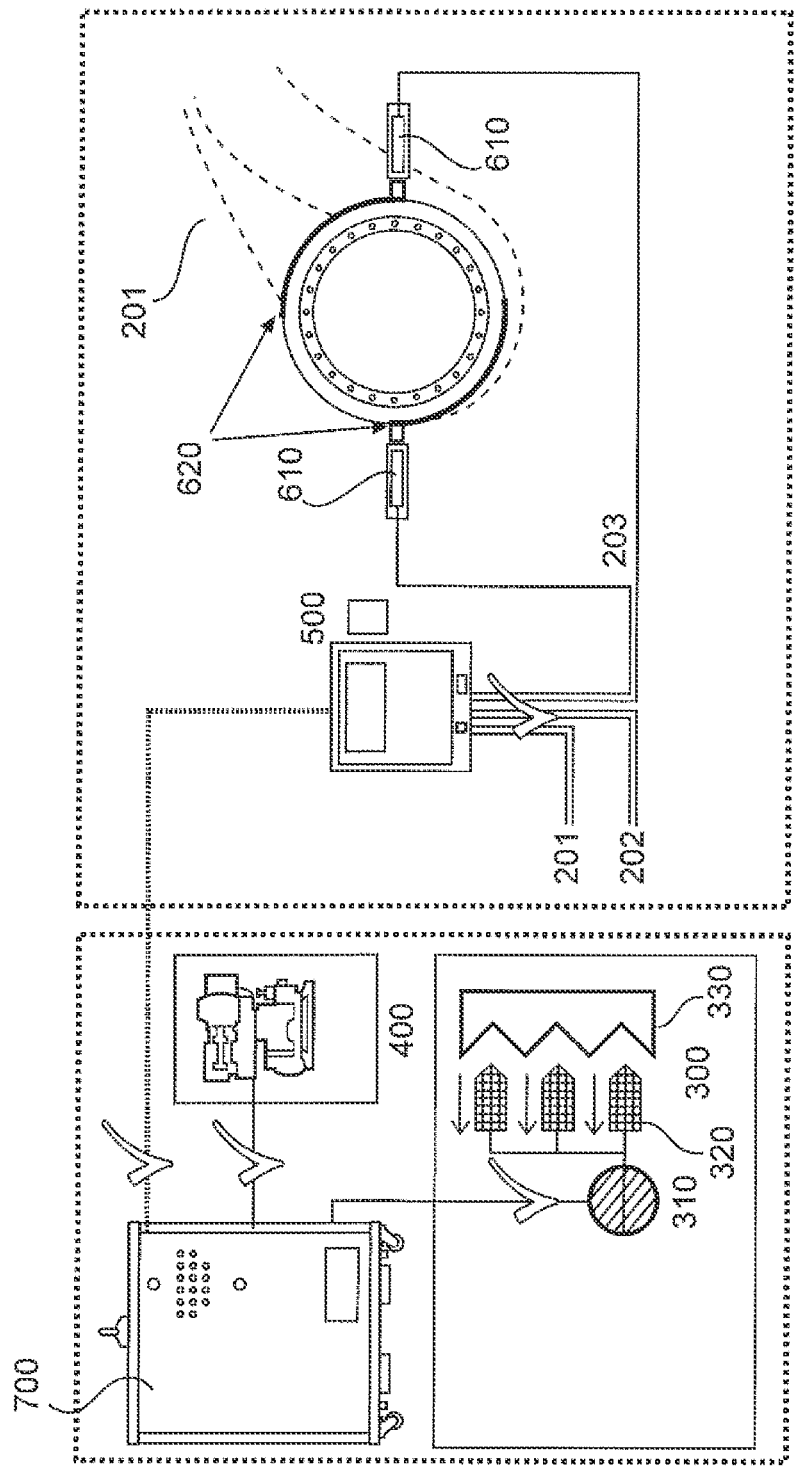
Figure 3:
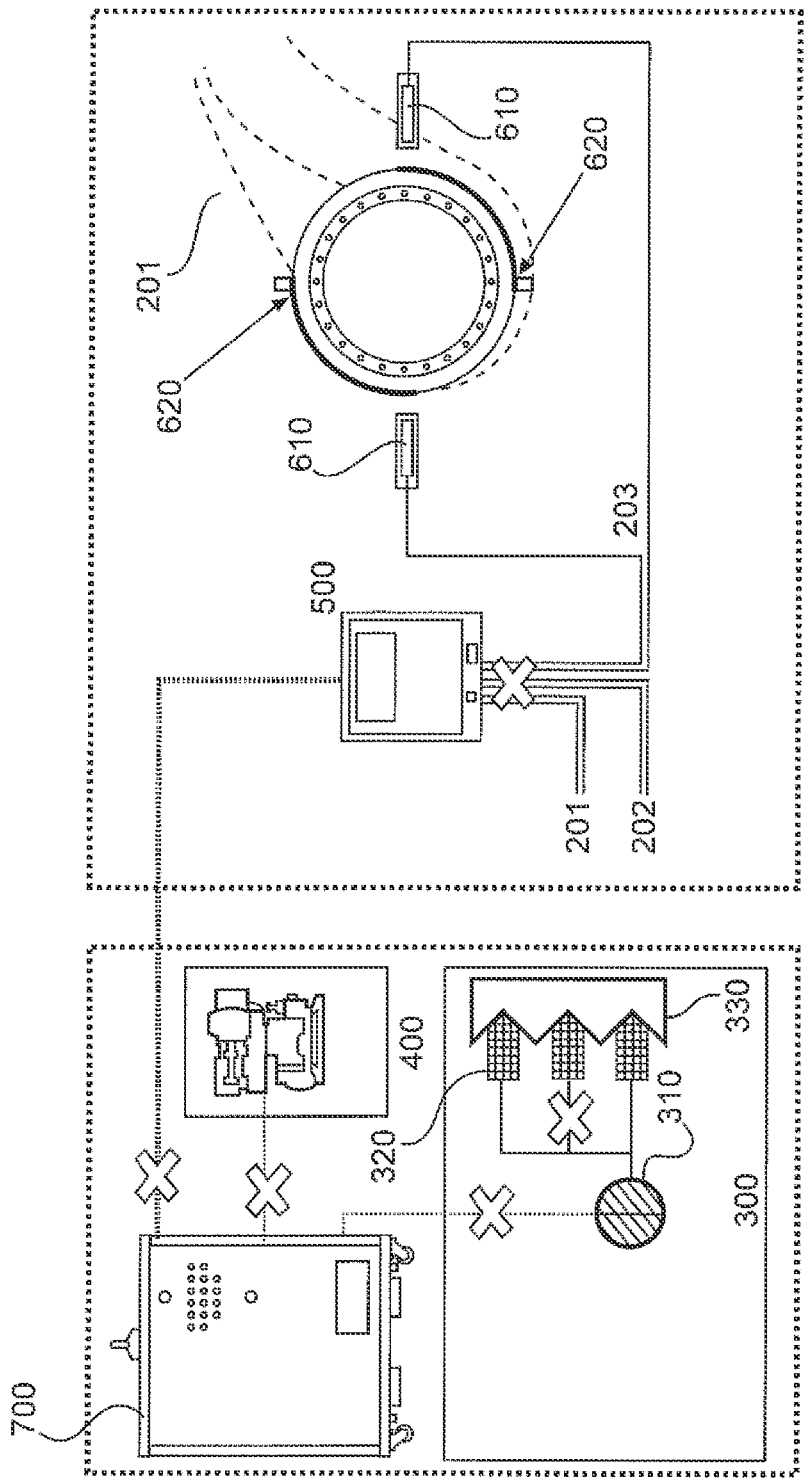

FIGS. 2 and 3 each show a diagrammatic view of the functional groups of a wind turbine according to a first embodiment. FIG. 2 shows in particular the rotor blade 203. The rotor blade 203 has for example a blade angle of 90° and can be arranged in the 3 o'clock position. A blade angle detection sensor 600 having for example two sensors 610 and two position gauges 620 can be provided in the region of a rotor blade root of the blade 203. The other two rotor blades 201, 202 can also have a corresponding blade angle detection sensor 600. The information from the blade angle detection sensors 600 of the three rotor blades 201-203 can be output to a blade angle controller 500. The information in respect of the blade angles of the three rotor blades 200, 201-203 can be combined together in the blade angle controller 500. The combined information can be passed to a construction aid 700. The construction aid 700 can be used in particular when the wind turbine is being erected and the wind turbine is not yet connected to the electrical energy supply grid. As an alternative thereto the construction aid 700 can be used after a service has been carried out on the wind turbine and the wind turbine was separated from the supply grid.

Certain functions of the wind turbine 100 like for example blade angle adjustment can be controlled by means of the construction aid 700 which represents a mobile controller. The brake 400 and the rotor arresting means 300 can be connected to the mobile controller 700 or the mobile controller 700 receives information in respect of operation of the brake 400 and the rotor arresting means 300.

The sensors 110 can be for example in the form of a inductive sensors.

The rotor arresting means 300 can optionally have an electromagnetic valve 310 and a plurality of bolts 320 which can be introduced into or removed from recesses 330 in the rotor in order to arrest or release the rotor.

As an alternative thereto the rotor arresting means can also be implemented in another way.

The mobile controller (construction aid) 700 is adapted, in particular when the wind turbine has been separated from the energy supply grid, to block unlocking of the rotor arresting means until the mobile controller 700 receives appropriate blade angle information from the controller 500. In other words the rotor arresting means 300 is deactivated or unlocked only when the three rotor blades 201-203 are in a desired position, for example the feathered position. Together with the rotor arresting means 300 the brake 400 can also be released when the controller 500 notifies the mobile controller 700 that the blade angles of the rotor blades 201-203 are in the desired position.

While the rotor blades in FIG. 2 are in the feathered position the rotor blades as shown in FIG. 3 are at a blade angle of less than 90°. In that case the blade angles of the three rotor blades 201-203 are not in the desired range and the controller 500 passes that information to the mobile controller 700 so that the rotor arresting means 300 and/or the brake 400 cannot be released.

Figure 4:
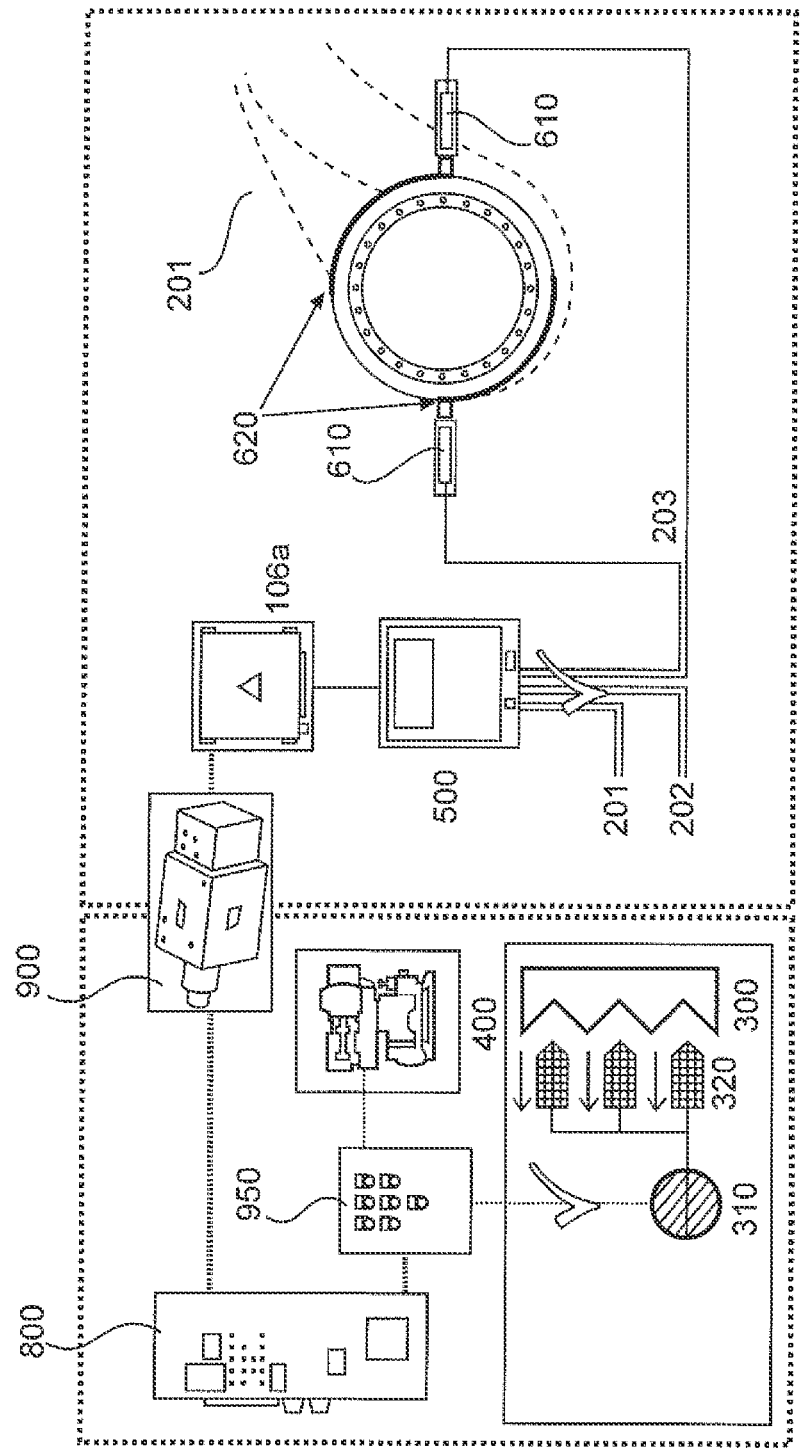
Figure 5:
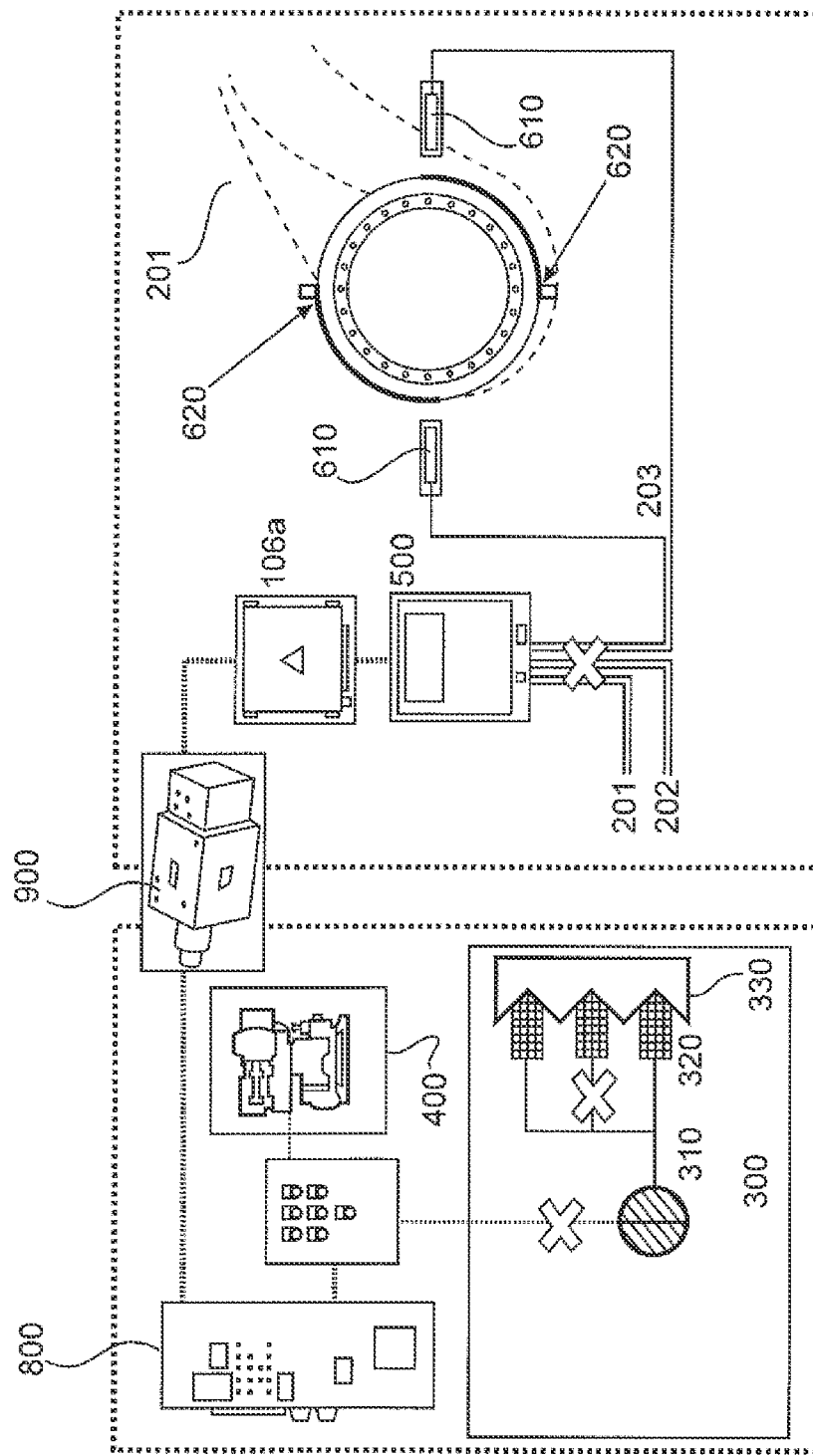

FIGS. 4 and 5 each show a diagrammatic view of the functional groups of a wind turbine according to a second embodiment of the invention. While the first embodiment relates to a mobile controller 700 the second embodiment describes how the method according to the invention is implemented with the fixed and central nacelle controller 800. In FIG. 4 the rotor blade 203 is shown in the 90° position and thus the connection box/controller 500 can transmit an appropriate signal by way of a rotor sub-distribution and a slip ring transmitter 900 to a nacelle controller 800. The nacelle controller 800 can be coupled to a stator unit 950 which in turn can be coupled to a rotor brake 400 and the rotor arresting means 300. The brake 400 and the rotor arresting means 300 respectively correspond to the brake 400 and the rotor arresting means 300 of the first embodiment.

In FIG. 5 the rotor blade 203 is at a blade angle of less than 90° and is thus not in the feathered position. That corresponding information relating to the respective rotor blades 201-203 is output to the controller 500 which combines those items of information and passes them to the nacelle controller 800 by way of the rotor sub-distribution 106a and the slip ring transmitter 900. In that case the stator unit 950 can release neither the rotor arresting means nor the brake 400 as the rotor blades 200 do not involve the desired blade angle.

The invention claimed is:

1. A method of controlling a wind turbine, the wind turbine comprising a rotor, a rotor arresting device, a rotor blade, a blade angle detection sensor and a central controller, the method comprising:

in a first operating mode, when the wind turbine is connected to an electrical supply grid and delivers energy to the electrical supply grid:
  controlling operation of the wind turbine using the central controller;

in a second operating mode, when the wind turbine is not connected to the electrical supply grid:
  connecting a construction aid in the form of a mobile controller to the wind turbine, wherein the construction aid includes an electrical power supply and a controller,
  deactivating a control of the rotor arresting device by the central controller,
  activating the construction aid to control the rotor arresting device,
  detecting a blade angle of the rotor blade,
  outputting the detected blade angle to the construction aid, and
  blocking an unlocking of the rotor arresting device using the construction aid in response to the detected blade angle not being within a predetermined blade angle range, and disconnecting the wind turbine from the construction aid and connecting the wind turbine to the electrical supply grid to activate the first operating mode.

2. The method of controlling a wind turbine according to claim 1 wherein the predetermined angle range of the rotor blade includes a feathered position of the rotor blade.

3. The method of controlling a wind turbine according to claim 1 comprising:
  disconnecting the wind turbine from the electrical supply grid,
  connecting the construction aid to the wind turbine,
  activating the construction aid to control the rotor arresting device, and
  activating the construction aid to control the rotor arresting device before the wind turbine has been re-connected to the electrical supply grid such that the wind turbine is not able to take energy from the energy supply grid for controlling the wind turbine.

* * * * *